J. ANDERES.
Velocipedes.

No. 153,697. Patented Aug. 4, 1874.

WITNESSES.

Jacob Anderes by Sidney & VanVatty

INVENTOR.

UNITED STATES PATENT OFFICE.

JACOB ANDERES, OF WESTCHESTER, NEW YORK, ASSIGNOR OF ONE-HALF HIS RIGHT TO FRANK SHAFFNER, OF SAME PLACE.

IMPROVEMENT IN VELOCIPEDES.

Specification forming part of Letters Patent No. 153,697, dated August 4, 1874; application filed June 12, 1874.

*To all whom it may concern:*

Be it known that I, JACOB ANDERES, (assignor to FRANK SHAFFNER, of Westchester, Westchester county, New York, of one-half interest,) of Westchester, Westchester county, New York, have invented, made, and applied to use, Improvements in the Construction of Vehicles, of which the following is a full, clear, and correct description, reference being had to the accompanying drawing making part of this specification, and to the letters of reference marked thereon, in which—

Figure 1:
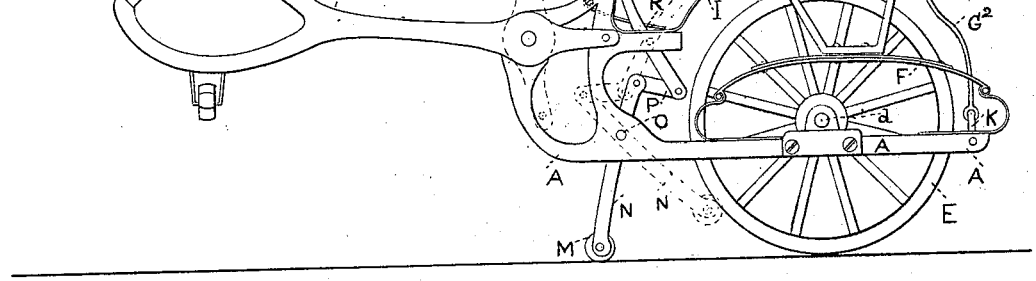
Figure 2:
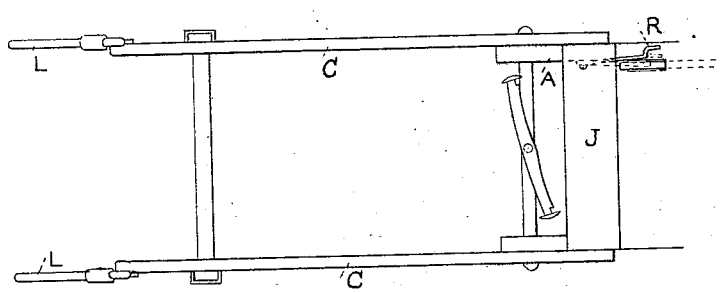
Figure 3:
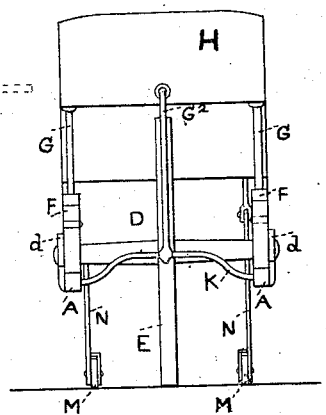

Figure 1 is a side view of my improved vehicle. Fig. 2 is a top view of the shafts C. Fig. 3 is a front view of the auxiliary rollers M.

In the drawing like parts of the invention are pointed out by the same letters of reference.

The nature of the present invention consists in the construction of a vehicle, provided with one wheel and shafts, swiveled so that they can be readily folded back when not in use; the object of the invention being the construction of a vehicle of less weight than the vehicle as usually constructed, and by the use of which great speed can be attained, and one which can be used upon different grades of ground.

To enable those skilled in the arts to make and use my invention, I will describe the construction and operation of the same.

A shows the frame of my vehicle for supporting the seat, and to which the shafts or poles C are swiveled at their rear ends. D shows an axle, free to revolve in the boxes $d$, secured upon the frame A, upon which axle D the driving-wheel E is fastened centrally. This wheel E is constructed in the usual manner. F are springs attached to the frame A, upon each side of the same, and to these springs are attached the U-shaped supports G, for supporting the seat H, the upper ends of the supports G being secured upon the under side of the seat H. The seat is also supported by a rod, $G^2$, attached at its lower back end, and also attached to a cross-rod, K, supported by the frame A. I shows a shield placed directly in front of the wheel E, and extending from the front end of the seat H, to and over the dash-board J of the vehicle. C are the shafts or poles, to which the animal is attached, swiveled at their rear ends to the sides of the frame A, and to the forward ends of these poles or shafts are swiveled the bow-shaped pieces L, employed to assist in sustaining the weight of the collar placed around the neck of the horse, straps being attached to the collar and passed over the bow-shaped pieces L, the shafts C and pieces L being swiveled, so that they may be accommodated to the height of the animal. M shows rollers, held in the lower portions of the uprights N, suspended upon a rod, O, passed through the forward portion of the frame A. P is a lever attached at one end to the upper portion of one of the uprights N, and at its opposite end to the lower portion of a bent lever, Q, passed through the shield I, and bearing upon and retained in position, when not in use, by a forked lever, R, fastened upon the frame A, and passed partially through the shield I.

Such being the construction, the operation may be thus set forth: The horse or animal is attached to the shafts or poles C of the vehicle, in the usual manner, the shafts or poles accommodating themselves the to height of the animal, and the straps, attached to the collar, are fastened to the bow-shaped pieces L. The vehicle will then be drawn by the horse or animal and from its lightness will be easily propelled. When necessary to stop the vehicle, the foot or hand of the operator may be brought into contact with the bent lever Q, and a forward movement imparted to the same, releasing it from its position within the forked portion of the lever R, by which forward movement the uprights N, provided with the rollers M, and connected to the lever Q, as described, are extended or thrown into a vertical position, and the rollers M will have a bearing upon the ground and stop the vehicle.

The shafts C, when not in use, may be turned back upon each side of the frame A, thus economizing room in packing or transporting.

Having now set forth my invention, what I claim as new is—

The frame A, supporting the seat H, and to which the reversible shafts C, provided with the bow-shaped pieces L, are attached, in combination with the wheel E, supported upon the axle D, the rollers M, uprights N, levers P and Q, and forked lever R, to operate as and for the purposes set forth.

JACOB ANDERES.

Witnesses:
A. SIDNEY DOANE,
JOSEPH MEEKS.